United States Patent
Ewasko et al.

[11] Patent Number: 5,811,018
[45] Date of Patent: Sep. 22, 1998

[54] MAGNETIC BARRIER FOR GAP CONTROL IN INTERLEAVED TAPE HEAD DESIGN

[75] Inventors: Diane C. Ewasko, Boulder; James C. Cates, Louisville, both of Colo.

[73] Assignee: Storage Technology Corporation, Louisville, Colo.

[21] Appl. No.: 594,851

[22] Filed: Jan. 31, 1996

[51] Int. Cl.$^6$ .................................................... B44C 1/22
[52] U.S. Cl. .............................................. 216/22; 216/41
[58] Field of Search ................... 216/22, 41; 360/126; 29/603

[56] References Cited

U.S. PATENT DOCUMENTS

| | | | |
|---|---|---|---|
| 5,141,623 | 8/1992 | Cohen et al. | 216/22 X |
| 5,296,993 | 3/1994 | Aboaf et al. | 360/126 |
| 5,363,265 | 11/1994 | Hsie et al. | 360/113 |
| 5,435,053 | 7/1995 | Krounbi et al. | 29/603 |

OTHER PUBLICATIONS

Kelley et al., "High–Track–Density, Coupled–Film Magnetoresistive Head", pp. 2890–2892, 1981, *IEEE Transactions on Magnetics,* vol. Mag–17, No. 6, Nov.

*Primary Examiner*—William Powell
*Attorney, Agent, or Firm*—Sheridan Ross P.C.

[57] ABSTRACT

The present invention discloses an improved structure and method for forming an interleaved magnetic head. In one aspect, an interleaved magnetic head is formed by providing a wafer comprising a first thick magnetic layer extending across read and write segments of the head and patterned to form a first read shield and a first write pole and, in a second step, a second thick magnetic layer is formed across the read and write segments of the head at substantially the same time to provide substantially all of a second read shield and substantially all of a second write pole. A write gap between the write poles may be formed in such a manner as to have a different thickness than the read gap between the read shields. In addition, tight processing control is maintained over the critical read gap thickness.

10 Claims, 4 Drawing Sheets

MAGNETIC BARRIER FOR GAP CONTROL IN INTERLEAVED TAPE HEAD DESIGN

FIELD OF THE INVENTION

The present invention generally relates to the field of magnetic read and write heads and, more particularly, to an interleaved magnetic head having a read element adjacent to a write element.

BACKGROUND OF THE INVENTION

An interleaved magnetic head includes an integrated read/write structure that incorporates a thin film write element having first and second pole layers and a read element with a magnetoresistive (MR) sensor between first and second shields. The interleaved MR head employs material layers that serve dual functions for the read and write elements. In particular, the interleaved MR head employs a first thick magnetic layer that serves as a first shield layer for the read element and as a first pole layer for the write element (S1/P1 layer) and a second thick magnetic layer that serves as a second shield layer for the read element and as a second pole layer for the write element (S2/P2 layer). The interleaved MR head further employs an insulator layer that provides electrical and magnetic insulation between the pole layers for the write element and between the shield layers for the read element.

The thickness of the insulator between the first and second pole layers defines the write gap length. The thickness of the insulator between the first and second shields defines the read gap. The interleaved head described in the invention features a write gap length that is the same or longer than the read gap length.

Prior art methods of manufacturing an interleaved head have required at least three separate thick magnetic layer deposition steps, each step generally requiring several hours of manufacturing time. In one step, a thick magnetic layer is deposited on a substrate to form the S1/P1 layer. Then, in at least two separate thick magnetic layer deposition steps, the S2 layer is separately formed from the P2 layer.

SUMMARY OF THE INVENTION

The present invention provides improvements in the structure for and the method of making an interleaved magnetic head having one or more read elements adjacent to one or more write elements. The magnetic head includes a wafer comprising a first thick magnetic layer that is patterned to define a first read shield in the read element and a first write pole in the write element, first and second gap layers covering the first thick magnetic layer, and a read transducer sandwiched between the first and second gap layers in the read element. The magnetic head further includes a second thick magnetic layer forming a second read shield in the read element and a second write pole in the write element. A third gap layer may be added within the write element to provide a write gap between the write poles that has a different thickness than the read gap between the read shields.

According to one aspect of the present invention, the second thick magnetic layer is deposited across both of the read and write elements of the head at substantially the same time to form substantially all of the second read shield for the read element and substantially all of the second write pole for the write element. In one embodiment, the read gap between the read shields has a different thickness than the write gap between the write poles. The second thick magnetic layer is then patterned to define the second read shield and the second write pole. Importantly, the present invention requires only two thick magnetic layer formation steps instead of the three or more thick magnetic layer formation steps required by the prior art.

According to another aspect of the present invention, a protective layer is formed on top of the second gap layer to prevent substantial alteration of the second gap layer in the read element during the formation and processing of subsequent layers, including the second thick magnetic layer, on an opposite side of the protective layer from the second gap layer.

In another embodiment of the present invention, the protective layer is formed from a thin magnetic layer that inhibits substantial alteration of the read gap thickness. In particular, while subsequent process steps, such as sputter etching, may decrease the thickness of the thin magnetic layer, the read gap which is formed between the thin magnetic protective layer and the first thick magnetic layer remains substantially constant. The thick magnetic layer is formed on top of the thin magnetic layer to provide a continuous magnetic second shield for the read element. The improved control of the read gap thickness provided with this technique is important for tightly controlling the bias point of the MR element of the read head.

In further embodiments of the present invention, the protective layer is removed from within the write element and a third gap layer is deposited to make the write gap larger than the read gap. For these further embodiments, the thickness of the read gap is defined by the combined thicknesses of the read transducer and the first and second insulating gap layers. The thickness of the write gap further includes the thickness of the third gap layer. The thickness of the third gap layer is selected to provide the additional thickness of the write gap over the thickness of the read gap. The third gap layer is formed across the read and write elements of the head and is then removed from within the read element of the head while the protective layer inhibits substantial alteration of the thickness of the read gap. The second thick magnetic layer is then formed across both of the read and write elements of the head and patterned to simultaneously define the second shield and the second pole with the third gap layer providing a write gap that is larger than the read gap.

Consequently, the present invention substantially reduces the time and cost of manufacturing an interleaved magnetic head and provides an improved magnetic head structure.

BRIEF DESCRIPTION OF THE DRAWINGS

For a more complete understanding of the present invention and further advantages thereof, reference is now made to the following Detailed Description, taken in conjunction with the Drawings, in which.

DETAILED DESCRIPTION OF THE INVENTION

Figure 1:
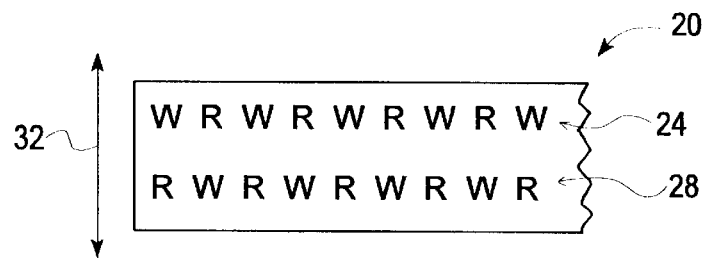
FIG. 1 is an interleaved head as viewed from a magnetic storage medium.

FIG. 1 illustrates an interleaved head 20 having interleaved write elements 24 and read elements 28 that are arranged in 2 rows and N columns as viewed from a magnetic storage media. A magnetic storage media is moved past the head 20 according to the direction of the arrow 32.

Figure 2:
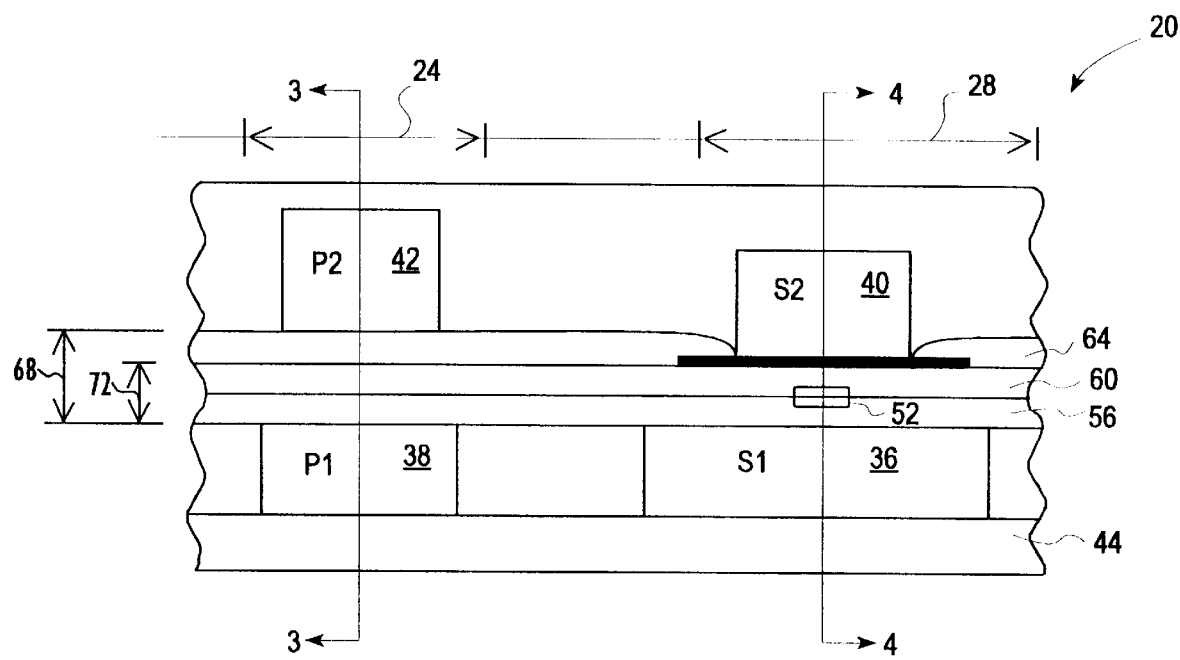
FIG. 2 is a more detailed illustration of a portion of a row of the interleaved read and write elements in FIG. 1 as viewed from the magnetic storage medium according to the present invention.
Figure 3:
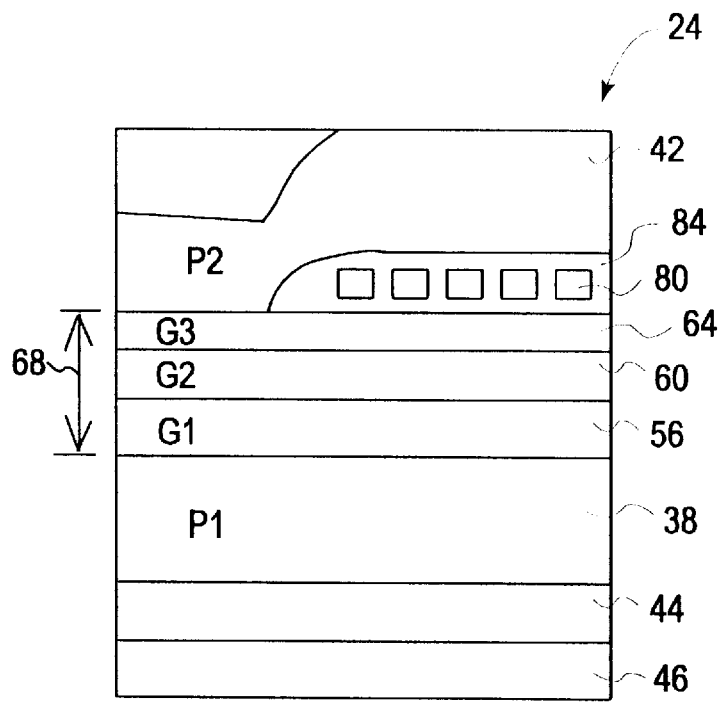
FIG. 3 is a cross sectional view along line 3—3 of the write element in FIG. 2 according to the present invention.
Figure 4:
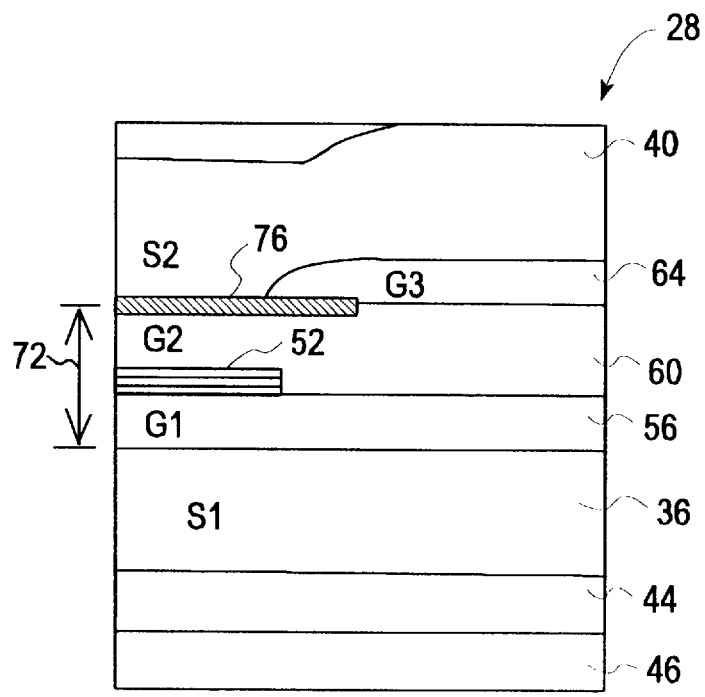
FIG. 4 is a cross sectional view along line 4—4 of the read element in FIG. 2 according to the present invention.

FIG. 2 is a more detailed illustration of a portion of a row of the interleaved read elements 28 and write elements 24 in FIG. 1 as viewed from the magnetic storage medium and according to the present invention. FIGS. 3 and 4 are cross sectional views of the write element 24 and the read element 28, respectively, in FIG. 2. In FIGS. 3 and 4, the magnetic storage medium would be positioned adjacent to the left side of the illustrated elements 24 and 28. It is noted that the dimensions of the layers and elements of the head 20 as shown in the figures are for illustration purposes and are not drawn to scale.

The head 20 includes adjacent interleaved read elements 28 and write elements 24. The read element 28 comprises a pair of shields 36 and 40 and the write element 24 comprises a pair of poles 38 and 42. The bottom shield 36 and the bottom pole 38 are formed on top of an optional first spacer layer 44 that, in turn, is formed on top of substrate 46. The read element 28 further comprises an MR sensor stack 52 which is sandwiched between a first gap layer 56 and a second gap layer 60. The gap layers 56 and 60 comprise an electrically and magnetically insulating material and extend across the read and write elements, 28 and 24.

As illustrated in FIG. 3, the write element 24 further comprises an optional third gap layer 64 and a conductive coil 80 that is electrically isolated from the poles 38 and 42 by additional insulation layers 84.

The write gap 68 between the poles 38 and 42 in the write element 24 is equal to or larger than the read gap 72 between the shields 36 and 40 in the read element 28. In the illustrated embodiment, the write gap 68 is larger than the read gap 72; however, in another embodiment these two gaps are the same or substantially the same. The thickness of the read gap 72 is substantially defined by the thicknesses of each of the first and second gap layers 56 and 60 and the thickness of the MR sensor stack 52. The thickness of the write gap 68 is substantially defined by the combined thicknesses of the first and second gap layers, 56 and 60, and the thickness of the third gap layer 64 in the write element 24.

The head 20 further includes an inventive protection layer 76 that inhibits substantial alteration of the read gap 72 during formation of the head elements on the other side of the protection layer 76 from the MR sensor 52. Importantly, the protection layer 76 enables a thick magnetic layer 40 to be deposited and patterned across the read and write elements, 28 and 24, to form the top shield 40 and the top pole 42 at substantially the same time while providing a difference between the write gap thickness 68 and the read gap thickness 72.

Figure 5:
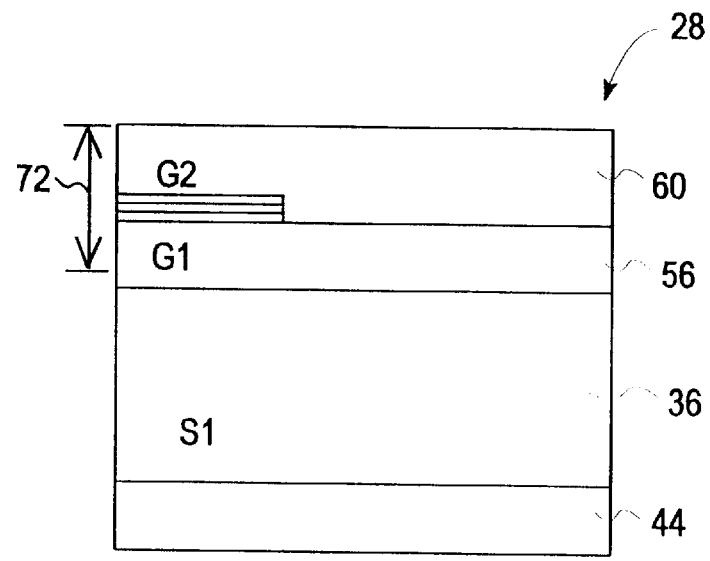
FIGS. 5—8 illustrate steps for fabricating the read element of FIG. 4 according to the present invention.

As will be explained below, the protection layer 76 enables the head 20 to be constructed according to novel steps that reduce the time and cost involved in making an interleaved head and allows the read gap thickness which is an important parameter governing the read performance to be more tightly controlled. FIGS. 5–8 illustrate the steps for fabricating the read element 28 according to the present invention. As shown in FIG. 5, a first thick magnetic layer is deposited, such as by an electroplating or sputtering process, on top of an optional first spacer layer 44 and extending across the read and write elements, 28 and 24, and patterned to form the bottom shield 36 and the bottom pole 38. The first thick magnetic layer of the bottom shield 36 and the bottom pole 38 generally include a soft magnetic material of high permeability having a thickness of between about 1 micrometer and 6 micrometers. Conventional deposition processes generally require several hours to build the desired thickness of the first thick magnetic layer. The bottom shield 36 and the bottom pole 38 can be patterned from the first thick magnetic layer by a conventional process such as chemical etching or ion milling.

The first gap layer 56 is deposited on top of the first thick magnetic layer that forms the shield 36 and pole 38 and extending across the read and write elements, 28 and 24. The MR sensor 52 stack is formed on top of the first gap layer 56 and within a segment of the read element 28. The second gap layer 60 is subsequently deposited on top of the first gap layer 56 and the MR sensor 52 and extending across the read and write elements, 28 and 24. The first and second gap layers, 56 and 60 can be formed from any material that provides electrical and magnetic insulation.

The combined thicknesses of the first and second gap layers, 56 and 60, and the MR sensor stack 52 defines the thickness of the read gap 72 between the bottom read shield 36 and the top read shield which consists of the thin magnetic layer 76 and the thick magnetic layer 40. The read gap 72 generally has a thickness of between about 0.1 micrometer to 1.2 micrometers, however the range of thicknesses of the read gap 72 is limited primarily by the thickness of the MR sensor 52 and gap layers 56 and 60 and by the frequency response and output signal required by the read channel.

Figure 6:
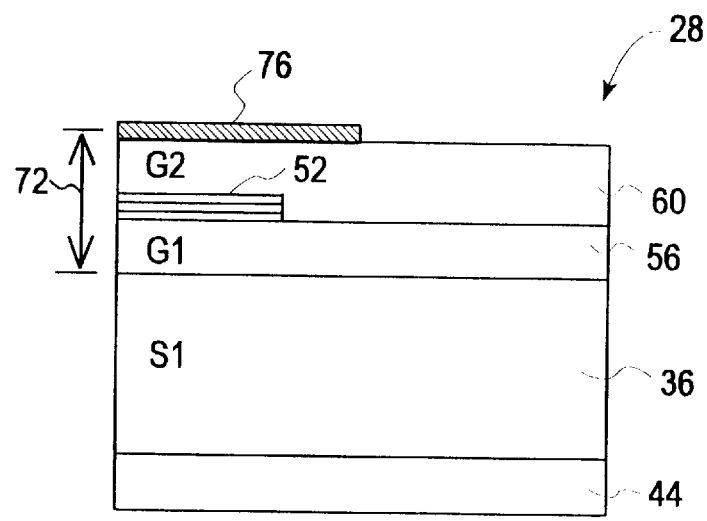

The protective layer 76 is formed on top of the second gap layer 60 and overlying the MR sensor 52, as shown in FIG. 6. In particular, the protective layer 76 can be deposited by sputtering, patterned using a photoresist, and segments of the protective layer 76 can be removed by chemical etching or ion milling. Preferably, the protective layer 76 comprises a thin magnetic layer that provides a physical barrier and etch stop for inhibiting removal of the second gap layer 60 over the MR sensor 52 during subsequent process steps on the other side of the protective layer 76 from the MR sensor 52. Preferably, the thin magnetic protective layer 76 is patterned to be disposed within only a segment of the read element 28 that overlies the read gap 72 (FIGS. 2–4).

The protective layer 76 has a thickness in a range that allows rapid formation of the layer 76 while being sufficiently thick to inhibit removal of the second gap layer 60 during subsequent process steps associated with the process steps of building the write head, such as sputter etching, chemical etching, or ion milling steps. A protective layer 76 comprising a magnetic material having a thickness of at least 100 Angstroms can protect the thickness of the read gap 72 during such subsequent process steps while a thickness of less than about 5000 angstroms permits deposition of the protective layer 76 in a few minutes using conventional deposition methods.

Figure 7:
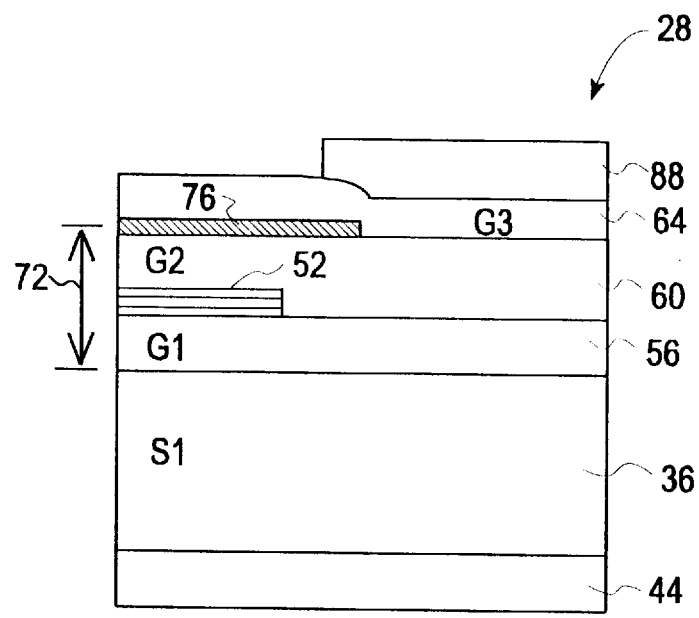
Figure 8:
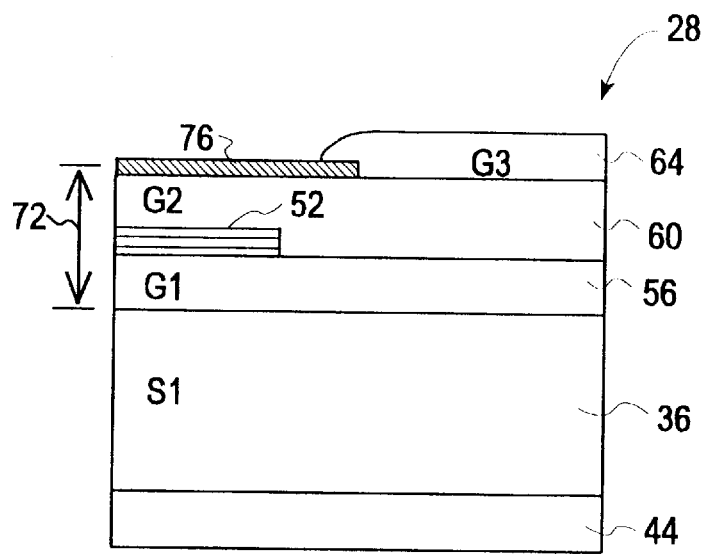

As shown in FIGS. 3,4, and 7, the third gap layer 64 is deposited across the read and write elements 24 and 28. The third gap layer 64 is deposited with a thickness that provides the desired increased thickness of the write gap 68 over the read gap 72. As further illustrated in FIG. 7, a photoresist layer 88 is deposited and patterned over the third gap layer 64 to enable the removal of the third gap layer 64 over the protective layer 76 in the read element 28 while the photoresist layer 88 inhibits removal of the third gap layer 64 within other portions of the read element 28 (FIG. 4) and within the write element 24 (FIG. 3). The photoresist layer 88 is deposited and defined using standard photolithographic techniques. The third gap layer 64 in the read element 28 is removed, such as by a chemical etching process, while the protective layer 76 inhibits removal of the second gap layer 60 over the MR sensor 52, as shown in FIG. 8. In this manner, the write gap 68 is made larger than the read gap 72 by the added thickness of the third gap layer 64 within the write element 24, as shown in FIG. 3.

Next, a second thick magnetic layer is deposited across the read and write elements, 28 and 24, of the head 20 and patterned to simultaneously form substantially all of the top read shield 40 and substantially all of the top write pole 42 (FIGS. 2–4). The second thick magnetic layer can be formed by sputtering or plating a soft magnetic material having a thickness of between about 1 micrometer and 6 micrometers similar to the process for forming the first thick magnetic layer for the bottom shield 36 and the bottom pole 38. The top shield 40 and the top pole 42 can be patterned from the second thick magnetic layer by a conventional process such as chemical etching or ion milling.

In this manner, the present invention uses two thick magnetic layer deposition processes to form substantially all of the bottom pole and shield and substantially all of the top pole and shield in an interleaved head, thereby saving hours of manufacturing time associated with forming the magnetic layers and reducing the cost of manufacturing an interleaved magnetic head when compared to prior art methods. Furthermore, the novel magnetic barrier and etch stop layer preserves the thickness of the read gap between the novel magnetic barrier and etch stop layer and the first thick magnetic layer during subsequent process steps for forming the interleaved magnetic head.

The foregoing discussion has been presented for purposes of illustration and description. Further, the description is not intended to limit the invention to the form disclosed herein. Variation and modification commensurate with the above teachings, within the skill and knowledge of the relevant art, are within the scope of the present invention. The embodiments described herein above are further intended to explain the best modes presently known of practicing the invention and to enable others skilled in the art to utilize the invention as presented, or in other embodiments, and with the various modifications required by their particular applications or uses of the invention. It is intended that the appended claims be construed to include alternative embodiments to the extent permitted by the prior art.

What is claimed is:

1. A method of forming an interleaved magnetic head having a read segment adjacent to a write segment, the method comprising the steps of:

providing a wafer comprising:

a first thick magnetic layer extending across said read and write segments of said head and patterned to form a first read shield for said read segment of said head and a first write pole for said write segment of said head, a first insulating gap layer on top of said first thick magnetic layer and extending across said read and write segments of said head, a read transducer on top of a portion of said first insulating gap layer and within said read segment of said head, and a second insulating gap layer on top of said first insulating gap layer and extending across said read and write segments of said head so that said read transducer is sandwiched between said first and second insulating gap layers;

forming a second thick magnetic layer across both of said read and write segments of said head at substantially the same time to provide substantially all of a second read shield for said read segment of said head and substantially all of a second write pole for said write segment of said head; and removing portions of said second thick magnetic layer to pattern said second read shield and said second write pole.

2. The method of claim 1, said step of forming a second thick magnetic layer provides said second thick magnetic layer with a thickness of between about 1 micrometer and 6 micrometer.

3. The method of claim 1, said step of forming a second thick magnetic layer comprises the step of:

forming a protective layer between said second insulating gap layer and said second thick magnetic layer, wherein said protective layer comprises a material that inhibits substantial alteration of the thickness of said read gap during subsequent processing.

4. The method of claim 3, said step of forming a protective layer comprises the step of:

forming a thin magnetic layer that inhibits substantial alteration of the thickness of said read gap during subsequent processing.

5. The method of claim 3, wherein:

said protective layer extends across one of said read segment and said write segment of said head.

6. The method of claim 3, wherein:

said protective layer extends over said read transducer.

7. The method of claim 3, said step of forming a protective layer provides said protective layer with a thickness of at least about 100 Angstroms.

8. The method of claim 3, said step of forming a protective layer provides said protective layer with a thickness of less than about 5000 Angstroms.

9. The method of claim 4, further comprising the step of:

forming an additional gap layer between said second thick magnetic layer and said second insulating gap layer in one of said write segment and said read segment of said head so that said write gap thickness is different from said read gap thickness.

10. The method of claim 9, said step of forming an additional gap layer comprising the steps of:

depositing an additional insulating gap material on top of said protective layer and extending across said read and write segments of said head; and removing said additional insulating gap material within one of said read segment and said write gap segment of said head while said protective layer inhibits substantial alteration of the thickness of said read gap.

* * * * *